June 14, 1932. H. KRAUSE 1,863,016
CLIP FOR FOUNTAIN PEN CAPS, PENCILS, AND THE LIKE
Original Filed Dec. 5, 1929
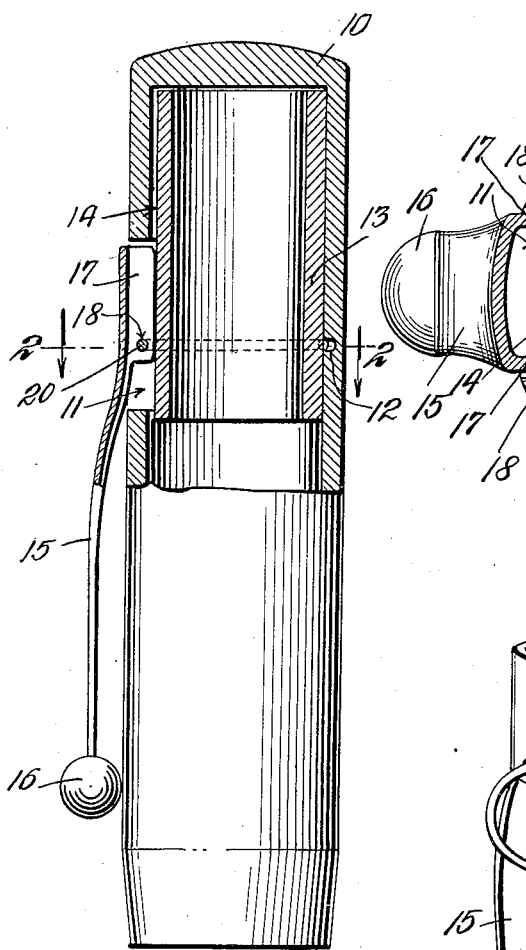
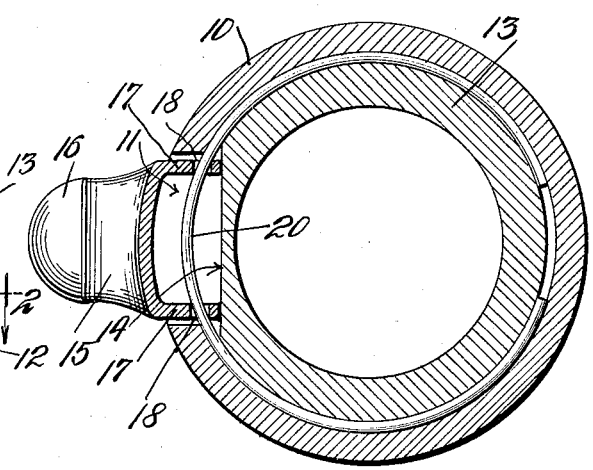
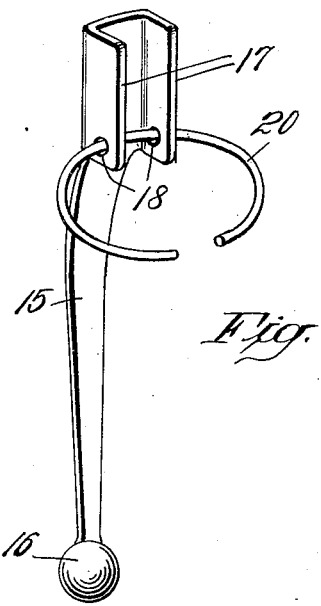
INVENTOR
Henry Krause
BY
Robert W Byerly
ATTORNEY Patented June 14, 1932

1,863,016

UNITED STATES PATENT OFFICE

HENRY KRAUSE, OF LITTLE NECK, NEW YORK

CLIP FOR FOUNTAIN-PEN CAPS, PENCILS AND THE LIKE

Application filed December 5, 1929, Serial No. 411,748. Renewed October 29, 1931.

This invention relates to clips for fountain-pen caps, pencils and the like, and aims to provide a clip unit which may be easily and securely attached to a tubular member.

In accordance with the invention, the tubular member (fountain-pen cap, pencil body or the like) is provided with a longitudinal slot and with an internal annular groove, and the clip has an end seated in the longitudinal slot and held in position by a split ring seated in the annular groove. Displacement of the ring from the groove is prevented by an internal plug member inserted in the tubular member.

In the accompanying drawing, I have shown the application of a clip embodying my invention to a fountain-pen cap of conventional construction:

Fig. 1 is a side view of the cap and clip partly in section;

Fig. 2 is an enlarged transverse section taken on the line 2—2 of Fig. 1; and

Fig. 3 is a perspective view of the clip and attachment member ready for application to a fountain-pen cap or the like.

The fountain-pen cap 10 is provided with a longitudinal slot 11 in one of its side walls, and with an internal annular groove 12 intersecting the slot 11. The cap is also provided with an internal bushing 13 which may have its outer surface flattened at 14 under the slot 11.

A spring clip 15 has the conventional ball 16 at one of its ends, and at its other end a pair of inturned side walls 17 containing aligned transverse holes 18.

A split ring 20 passes through the holes 18 and is held in the annular groove 12 by the bushing 13, so that it securely holds the side walls 17 of the clip member in the slot 11, thus attaching the clip to the fountain-pen cap.

The clip unit, consisting of the clip and the split ring applied thereto as shown in Fig. 3, is applied to the cap 10, before the bushing 13 is inserted, by turning the clip at right angles to the cap, inserting the split ring 20 through the slot 11, and then turning the clip parallel to the cap to turn the split ring and seat it in the annular groove 12. The bushing 13 is then inserted in the cap to hold the clip and ring in position.

It will readily be understood that the clip embodying my invention may be applied not only to fountain-pen caps, but also to pencil bodies and other tubular members.

As various changes may be made in the form, construction and arrangement of the parts without departing from the spirit of the invention or sacrificing its advantages, it is to be understood that all matter herein is to be interpreted as illustrative and not in a limiting sense.

What I claim is:

1. The combination with a tubular body having an elongated aperture in its wall and a groove in the bore of said body adjacent to said aperture, of a clip arranged longitudinally of said tubular body with one end thereof in said aperture, a split ring adapted to be placed in the groove of said body and passed through said clip to support the same in connection with said body, and means arranged in the bore of said body for retaining said ring against displacement from said groove.

2. The combination with a clip for fountain-pen caps, of a split ring for supporting said clip in connection with said cap, said ring being arranged in a groove in the bore of the cap, and means in said bore for preventing displacement of said ring.

3. The combination with a tubular body having a longitudinal slot in the wall thereof and a groove in the bore of said body adjacent to said slot, of a clip having inturned side walls lying in said slot and containing aligned holes, and a split ring passing through said holes and lying in the annular groove in the body.

4. In a device of the class described, the combination of a tubular member having a slot therein, a clip having inturned flange portions of substantial length seated in said slot and having straight lower edges, a bushing fitting into said tubular member, and engaging said straight edges, and mounting means for said clip adapted to hold said clip against said bushing.

5. In a device of the class described, the combination of a tubular member having a slot therein, a clip having inturned flange portions fitted into said slot, a bushing adapted to fit into said tubular member, and a split ring extending about said bushing intermediate said bushing and said tubular member, to hold said clip against said bushing, whereby the flanges of the clip engage the bushing to prevent rotation of the clip about said split ring.

6. In a device of the class described, the combination of a tubular member having a slot therein, a clip having flange members fitted into said slot, a bushing fitting into said tubular member, and a member extending through said flanges and between said tubular member and said bushing to secure said clip in position, said flange members being of sufficient length to engage said bushing and to prevent said clip from rotating about said member extending through the flanges.

In testimony whereof I have hereunto set my hand.

HENRY KRAUSE.